(12) United States Patent
Bindal et al.

(10) Patent No.: US 12,403,605 B2
(45) Date of Patent: Sep. 2, 2025

(54) METHODOLOGY FOR SAFE REMOTE HUMANOID TAKEOVER FOR MULTI-USER TELEXISTENCE WITH MINIMAL HARDWARE USER REQUIREMENTS

(71) Applicant: HITACHI, Ltd., Tokyo (JP)

(72) Inventors: Himanshu Bindal, Farmington Hills, MI (US); Satoshi Nakamura, Novi, MI (US)

(73) Assignee: HITACHI, LTD., Tokyo (JP)

( * ) Notice: Subject to any disclaimer, the term of this patent is extended or adjusted under 35 U.S.C. 154(b) by 164 days.

(21) Appl. No.: 18/375,296

(22) Filed: Sep. 29, 2023

(65) Prior Publication Data

US 2025/0108511 A1  Apr. 3, 2025

(51) Int. Cl.
| | |
|---|---|
| *B25J 9/16* | (2006.01) |
| *B25J 9/00* | (2006.01) |
| *B25J 19/02* | (2006.01) |
| *G06V 10/70* | (2022.01) |
| *G06V 40/10* | (2022.01) |
| *G06V 40/20* | (2022.01) |

(52) U.S. Cl.
CPC ........... *B25J 9/1689* (2013.01); *B25J 9/0006* (2013.01); *B25J 9/161* (2013.01); *B25J 9/163* (2013.01); *B25J 9/1674* (2013.01); *B25J 19/023* (2013.01); *G06V 10/70* (2022.01); *G06V 40/10* (2022.01); *G06V 40/20* (2022.01)

(58) Field of Classification Search
CPC ........ B25J 9/1689; B25J 9/0006; B25J 9/161; B25J 9/163; B25J 9/1674; B25J 19/023; B25J 13/00; G06V 10/70; G06V 40/10; G06V 40/20; G05B 2219/40131; G05B 2219/40202; G05B 2219/40264; G05B 19/042; G06F 3/017; G06F 3/011
See application file for complete search history.

(56) References Cited

U.S. PATENT DOCUMENTS

| | | | |
|---|---|---|---|
| 2015/0097669 A1* | 4/2015 | Li | G08B 21/24 455/435.1 |
| 2016/0316363 A1* | 10/2016 | Li | H04W 12/04 |
| 2018/0338241 A1* | 11/2018 | Li | H04W 4/40 |
| 2020/0344602 A1* | 10/2020 | Li | H04L 67/125 |

\* cited by examiner

*Primary Examiner* — Bhavesh V Amin
(74) *Attorney, Agent, or Firm* — PROCOPIO, CORY, HARGREAVES & SAVITCH LLP (57) ABSTRACT

A method for performing telexistence, which may include receiving, by a processor, a request to control a humanoid from a remote user; determining, by the processor, acceptance of the request by a host; for the request being determined as accepted, verifying, by the processor, receipt of a set of initiating signals; for the set of initiating signals being received: receiving a humanoid mapping method chosen by the remote user, and controlling the humanoid based on the humanoid mapping method determined by the remote user; and for the set of initiating signals not being received, terminating, by the processor, the request to control the humanoid.

20 Claims, 6 Drawing Sheets

METHODOLOGY FOR SAFE REMOTE HUMANOID TAKEOVER FOR MULTI-USER TELEXISTENCE WITH MINIMAL HARDWARE USER REQUIREMENTS

BACKGROUND

Field

The present disclosure is generally directed to a method and a system for performing telexistence.

Related Art

Collaboration in the information technology (IT) sector with people across different parts of the world has now become possible using collaboration software. Use of the collaboration software allows users to share, discuss, and amend material in real-time. However, such interactive collaborative software or hardware is not available for sectors where physical interaction is involved. Traditional collaboration method requires the participants' physical presence at a single location in real-time. Traveling to the meeting location tend to incur additional operation costs and cause delays that may lead to reduced customer satisfaction.

Telexistence is the concept by which a user can control a humanoid or robot remotely and perform actions with real-world objects that allows the user to interact in the physical space. However, the control of the humanoid is limited to a single user at a single event, thus limiting collaboration through telexistence for multiple users.

In the related art, a method for controlling a humanoid remotely through virtual reality (VR) headset and hand-held hardware by a single person is disclosed. However, the method does not allow multiple users to remotely operate/control the humanoid successively in a single function/event, nor does it permit remote viewing of the humanoid's action by viewers connected remotely.

In the related art, a method for controlling a humanoid through a stationary maneuvering system is disclosed. The stationary maneuvering system allows the humanoid to be operated by mapping/mimicking actions of a user through wearable controls of the maneuvering system. However, the stationary maneuvering system itself can be expensive and would not allow multiple users to remotely operate/control the humanoid successively.

SUMMARY

Aspects of the present disclosure involve an innovative method for performing telexistence. The method may include receiving, by a processor, a request to control a humanoid from a remote user; determining, by the processor, acceptance of the request by a host; for the request being determined as accepted, verifying, by the processor, receipt of a set of initiating signals; for the set of initiating signals being received: receiving a humanoid mapping method chosen by the remote user, and controlling the humanoid based on the humanoid mapping method determined by the remote user; and for the set of initiating signals not being received, terminating, by the processor, the request to control the humanoid.

Aspects of the present disclosure involve an innovative non-transitory computer readable medium, storing instructions for performing telexistence. The instructions may include receiving, by a processor, a request to control a humanoid from a remote user; determining, by the processor, acceptance of the request by a host; for the request being determined as accepted, verifying, by the processor, receipt of a set of initiating signals; for the set of initiating signals being received: receiving a humanoid mapping method chosen by the remote user, and controlling the humanoid based on the humanoid mapping method determined by the remote user; and for the set of initiating signals not being received, terminating, by the processor, the request to control the humanoid.

Aspects of the present disclosure involve an innovative server system for performing telexistence. The server system may include receiving, by a processor, a request to control a humanoid from a remote user; determining, by the processor, acceptance of the request by a host; for the request being determined as accepted, verifying, by the processor, receipt of a set of initiating signals; for the set of initiating signals being received: receiving a humanoid mapping method chosen by the remote user, and controlling the humanoid based on the humanoid mapping method determined by the remote user; and for the set of initiating signals not being received, terminating, by the processor, the request to control the humanoid.

Aspects of the present disclosure involve an innovative system for performing telexistence. The system may include means for receiving a request to control a humanoid from a remote user; means for determining acceptance of the request by a host; for the request being determined as accepted, means for verifying receipt of a set of initiating signals; for the set of initiating signals being received: means for receiving a humanoid mapping method chosen by the remote user, and controlling the humanoid based on the humanoid mapping method determined by the remote user; and for the set of initiating signals not being received, means for terminating the request to control the humanoid.

BRIEF DESCRIPTION OF DRAWINGS

A general architecture that implements the various features of the disclosure will now be described with reference to the drawings. The drawings and the associated descriptions are provided to illustrate example implementations of the disclosure and not to limit the scope of the disclosure. Throughout the drawings, reference numbers are reused to indicate correspondence between referenced elements.

DETAILED DESCRIPTION

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of the ordinary skills in the art practicing implementations of the present application. Selection can be conducted by a user through a user interface or other input means, or can be implemented through a desired algorithm. Example implementations as described herein can be utilized either singularly or in combination, and the functionality of the example implementations can be implemented through any means according to the desired implementations.

Present example implementations relate to methods and systems for performing multi-user telexistence through multi-user collaboration. Example implementations provide multi-user collaborated telexistence with limited hardware while ensuring safe takeover of the humanoid by subsequent remote user. A user's body motion is predicted using a camera utilizing machine learning algorithms. The camera can be a built-in camera that is associated with a computing device such as a laptop, tablet, etc. In some example implementations, an external camera may be utilized instead of a built-in camera. A VR headset, which provides additional motion signals to the system, would be required should the user desire to control the humanoid.

Figure 1:
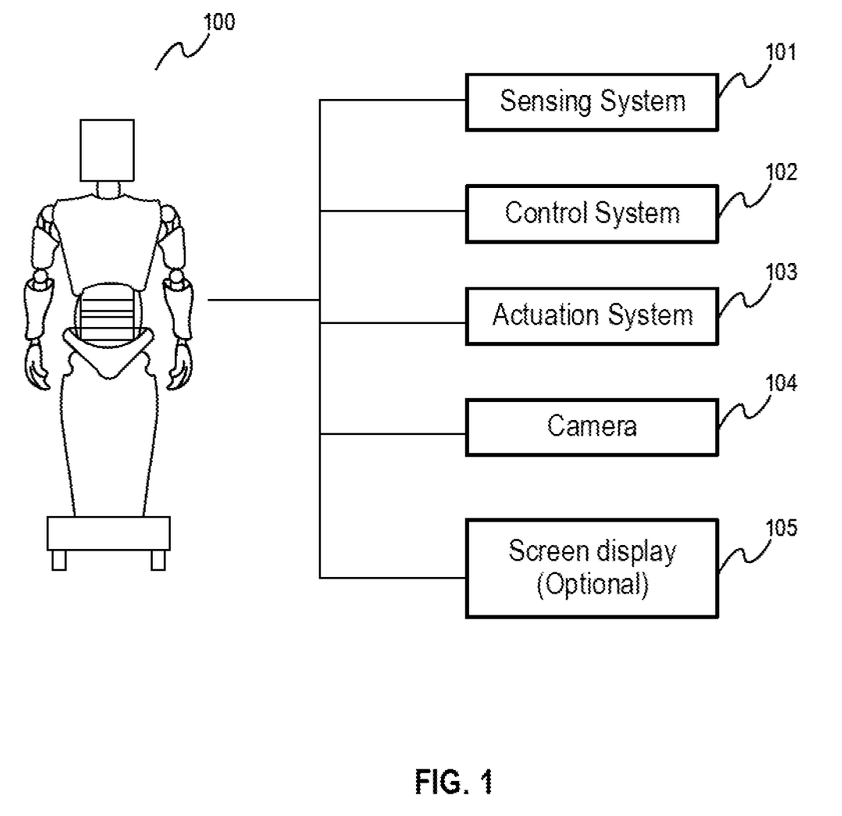
FIG. 1 illustrates an example system of a humanoid 100, in accordance with an example implementation.

FIG. 1 illustrates an example system of a humanoid 100, in accordance with an example implementation. As illustrated in FIG. 1, the humanoid 100 may include components such as a sensing system 101, a control system 102, an actuation system 103, and a camera 104. The sensing system 101 may include components such as, but not limited to, audio sensors, movement sensors, load sensors, touch sensors, etc. The sensing system 101 may be used to detect joint weight load and issue joint weight signal represents detected joint weight load. The control system 102 is used for controlling actions/motions of the humanoid 100, and may receive signals from other components of the humanoid 100 and the remote user for performing control of the humanoid 100. The actuation system 103 performs movement of the humanoid 100 and may involve at least one of hydraulic actuators, pneumatic actuators, or electric actuators. Control signal is sent from the control system 102 to the actuation system 103 to provide instructions for movement control. The camera 104 allows the remote user to view the humanoid's environment and actions as perceived from the point of view of the humanoid 100 through a communication network.

In some example implementations, the humanoid 100 may also include a screen display 105. The screen display 105 can be used for environment viewing or screen sharing by a user or other viewers/participants. The humanoid 100 replicates user actions remotely from any location around the globe. In some example implementations, instant customer assistance can be provided through use of the humanoid 100.

Figure 2:
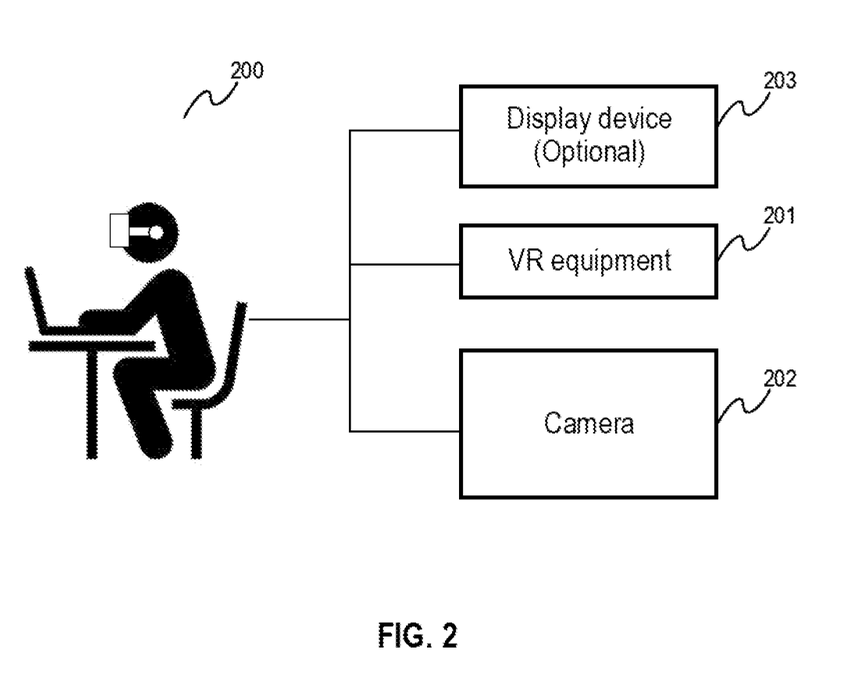
FIG. 2 illustrates an example remote configuration 200 for a remote user controlling the humanoid 100, in accordance with an example implementation.

FIG. 2 illustrates an example remote configuration 200 for a remote user controlling the humanoid 100, in accordance with an example implementation. The remote configuration 200 communicates with the humanoid 100 through a network, which is not shown in the figure. As illustrated in FIG. 2, remote configuration 200 may include devices such as, but not limited to, a virtual reality (VR) equipment 201 and a camera 202. The VR equipment 201 can be a VR headset, which allows the remote user to view the humanoid's environment as perceived through camera 104 of the humanoid 100. The camera 202 may be a built-in camera to a computing device (e.g. laptop, tablet, smart phone, etc.) or an external camera connected to a computing device (e.g. personal computer, laptop, etc.) The camera 202 is directed at the remote user and tracks/captures body motion of the remote user. In some example implementations, the camera 202 may transmit the captured feed through a network for display on the screen display 105 of the humanoid 100.

In some example implementations, the remote configuration 200 may further include an optional display device 203 such as a monitor. The display device 203 allows the remote user to display and view the humanoid's environment as perceived through the camera 104 of the humanoid 100. Information received from the humanoid 100, such as warning messages or notifications, may be displayed on the VR equipment 201 or the display device 203.

Figure 3:
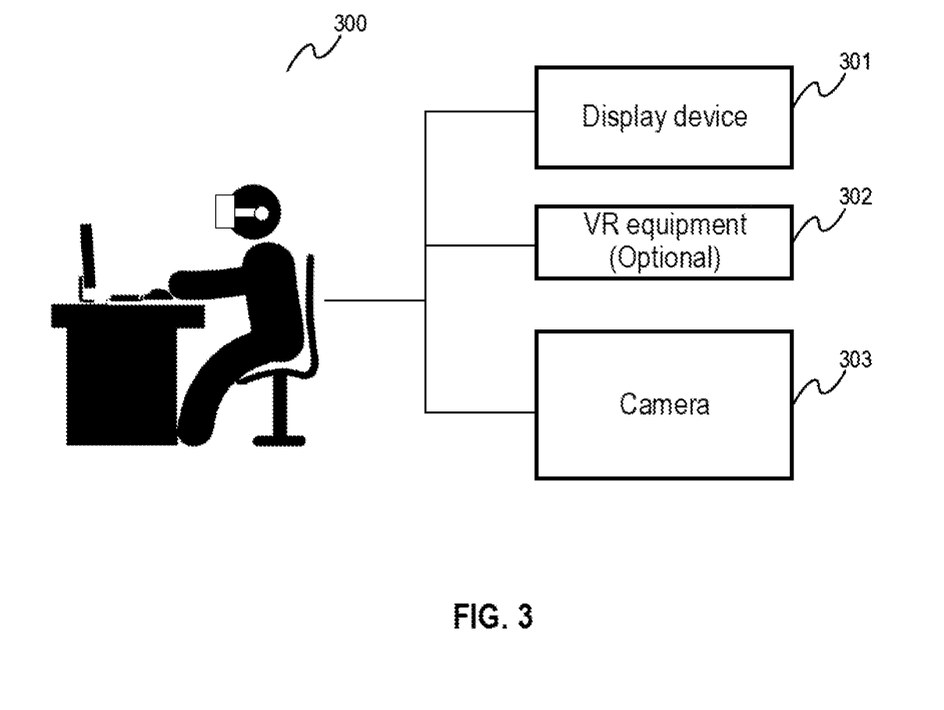
FIG. 3 illustrates an example remote viewer configuration 300, in accordance with an example implementation.

FIG. 3 illustrates an example remote viewer configuration 300, in accordance with an example implementation. remote viewer is a participant to a humanoid control session where the humanoid 100 is being controlled by a remote user. The remote viewer configuration 300 communicates with the humanoid 100 through a network, which is not shown in the figure. As illustrated in FIG. 3, remote viewer configuration 300 may include devices such as, but not limited to, a display device 301. Actions performed by the humanoid 100 or the humanoid's environment as perceived through the camera 104 of the humanoid 100 can be visualized on the display device 301.

In some example implementations, the remote viewer configuration 300 may further include a VR equipment 302 for visualizing the actions performed by the humanoid 100 or the humanoid's environment as perceived through the camera 104 of the humanoid 100. In some example implementations, the remote viewer configuration 300 may further include a camera 303. The camera 303 is similar to camera 202 of FIG. 2, and may be a built-in camera to a computing device (e.g. laptop, tablet, smart phone, etc.) or an external camera connected to a computing device (e.g. personal computer, laptop, etc.) The camera 303 is directed at the remote viewer and may transmit the captured feed through the network for display on the screen display 105 of the humanoid 100.

Any of the one or more remote viewers may be a host-authorized user. Similar to a remote user, a host-authorized user may also be given access to control the humanoid 100, provided that the host-authorized user has the required devices for controlling the humanoid 100.

Figure 4:
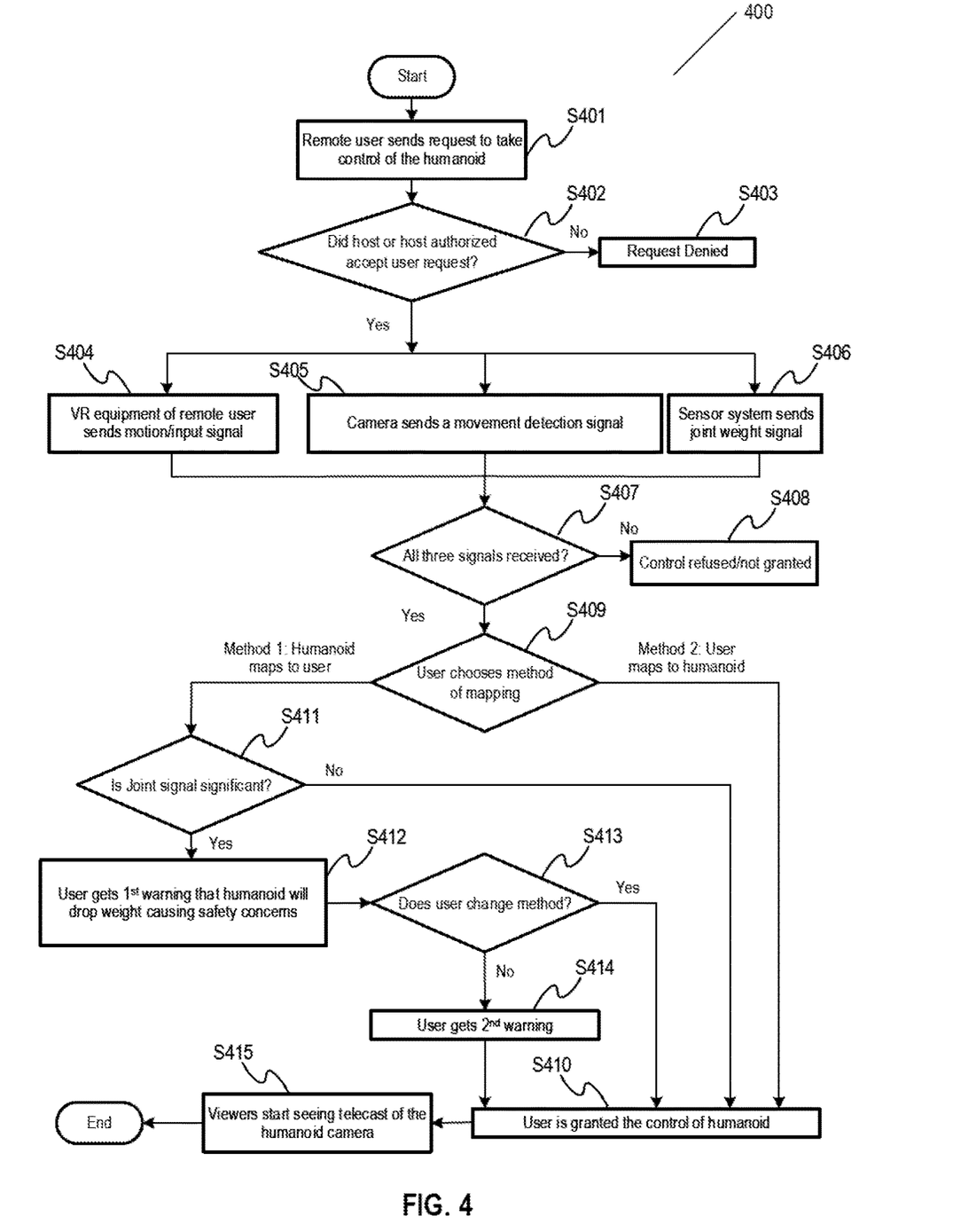
FIG. 4 illustrates an example process flow 400 for performing telexistence, in accordance with an example implementation.

FIG. 4 illustrates an example process flow 400 for performing multi-user telexistence, in accordance with an example implementation. The process begins at step S401 where a request to take control of the humanoid 100 is sent by a remote user. At step S402, a determination is made as to whether a host or a host-authorized user has accepted the request of the remote user. The right to provide control of the humanoid 100 to the remote user is given to the host as well as the host-authorized users. If the request is not accepted at step S402, then the control request of the remote user is denied at step S403.

At step S404, a motion/input signal is sent from the VR equipment 201 (e.g. VR headset) of the remote user. At step S405, a movement detection signal, such as a feed signal, is received from the camera 202. At step S406, a joint weight signal indicating joint weight load is transmitted from the sensing system 101 of the humanoid 100. The three signals of steps S404-406, initiating signal set, must be received in order for the remote user to receive control of the humanoid 100. Verification or determination of the receipt of the set of initiating signals is performed at step S407.

If any signal of the set of initial signals is not received at step S407, then control of the humanoid 100 is not granted at step S408. If the set of initial signals are received at step S407, then the process continues to step S409 where the remote user selects between humanoid-to-user mapping and user-to-humanoid mapping as the humanoid mapping method. The remote user is given the choice of two methods in reaching common initial posture between him/her and the humanoid 100 before taking control of the humanoid 100. The two options are humanoid-to-user mapping, shown as method 1 in FIG. 4, and user-to-humanoid mapping, shown as method 2 in FIG. 4. Under humanoid-to-user mapping, the humanoid 100 reaches/replicates the remote user's body posture or orientation before handing over the control. Under user-to-humanoid mapping, the remote user reaches/replicates the posture or orientation of the humanoid 100 to take over from the humanoid 100 from an orientation/configuration left from a terminated prior telexistence session associated with a prior remote user. At step S409, if the remote user selects user-to-humanoid mapping as the humanoid mapping method, then the process continues to step S410 where the remote user is granted control of the humanoid 100.

If the remote user selects humanoid-to-user mapping as the humanoid mapping method, then the process proceeds to step S411 where a determination is made as to whether the joint weight load is significant based on the posture or orientation of the humanoid 100. A significant joint weight load indicates that the humanoid 100 may be holding a weight/item. Joint weight load is determined from the joint weight signal received from the sensing system 101 of the humanoid 100 at step S406. If it is determined that joint weight load is not significant, then the process continues to step S410 wherein the remote user is granted control of the humanoid 100.

If it is determined that joint weight load is significant, then a first warning message is sent to the remote user warning the remote user of the potential safety concerns that may arise from humanoid-to-user mapping at step S412. The first warning message may indicate a potential weight/item drop and potential damages that may be caused by dropping of the weight/item. In some example implementations, the remote user may receive a request as part of the first warning message to change humanoid mapping method, which leads to a determination as to whether the remote user agrees to the request to change humanoid mapping method at step S413.

In response to the first warning message, if the remote user chooses to change the humanoid mapping method at step S413, then the user is granted control of the humanoid 100 at step S410. If the remote user chooses to proceed with humanoid-to-user mapping as the humanoid mapping method, then the process continues to step S414 where a second warning message is sent to the remote user warning of the potential hazards that may arise. On issuing the second warning message, the user is then granted control of the humanoid 100 at step S410. In some example implementations, the remote user is required to respond to the second warning message, which may be a request to the remote user confirming reaffirming the humanoid mapping method. Such response may include conformation of the humanoid mapping method through clicking of an acceptance button through an input device. The first warning message and the second warning message are sent to the remote user and displayed on the VR equipment 201 or the optional display device 203. At step S415, camera 104 of the humanoid 100 telecasts the humanoid's environment and the motion of the humanoid 100 on the VR equipment 201 or the optional display device 203.

Passing control of the humanoid 100 from a current remote user to a subsequent remote user requires the subsequent remote user to follow the steps shown in FIG. 4. On passing of control, control of the humanoid 100 by the current remote user, prior remote user to be, is terminated and the subsequent remote user is granted control of the humanoid 100.

Figure 5:
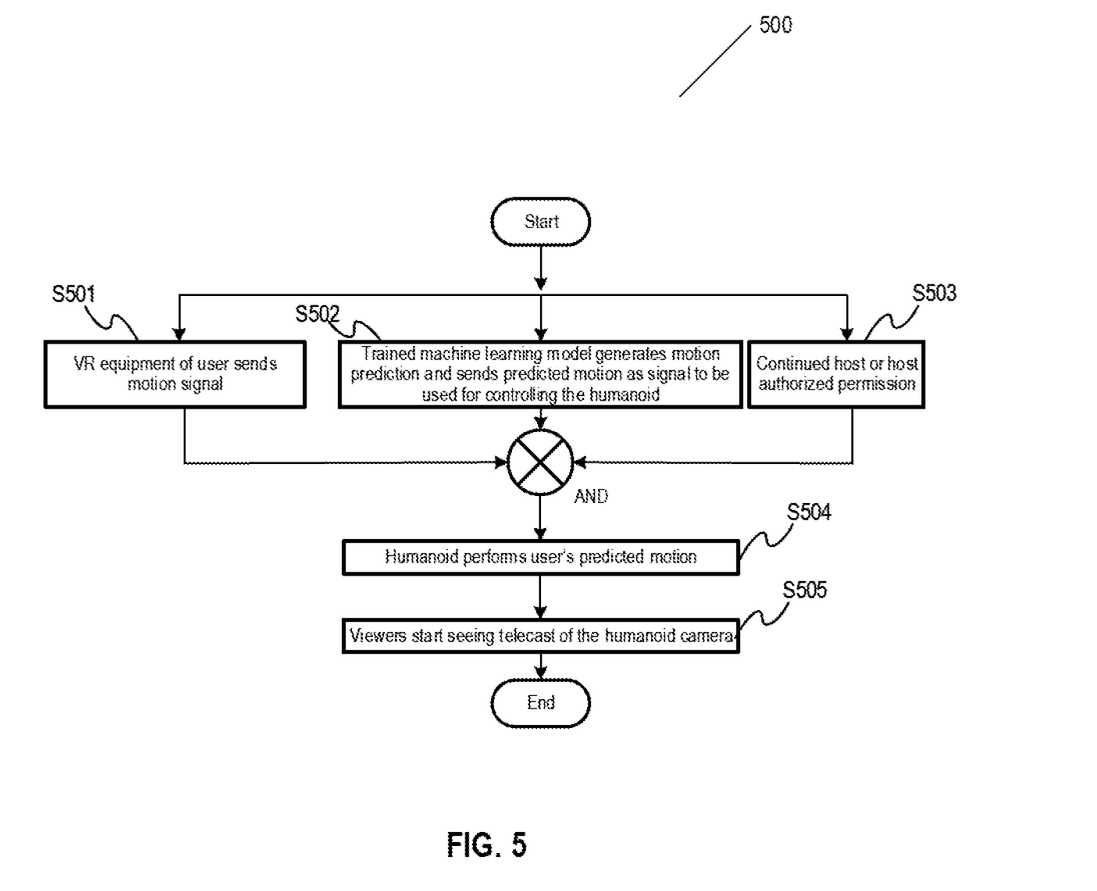
FIG. 5 illustrates an example process flow 500 of performing telexistence after the remote user has been given control of humanoid 100, in accordance with an example implementation.

FIG. 5 illustrates an example process flow 500 of performing telexistence after the remote user has been given control of humanoid 100, in accordance with an example implementation. The process begins with the motion/input signal being sent from the VR equipment 201 (e.g. VR headset) of the remote user at step S501, a trained machine learning (ML) model generating motion prediction as a signal for controlling the humanoid 100 and sent to the control system 102 at step S502, and receipt of continued host or host authorized permission to control the humanoid 100 at step S503. At step S502, the body motion/tracked motion of the remote user as observed by the camera 202 is fed into the trained ML model to generate motion prediction/motion mapping and the predicted motions are sent as a signal to the control system 102 for controlling the humanoid 100.

The signals and permission as derived from steps S501-503 must be received and continuous in order for the remote user to maintain control of the humanoid 100. At step S504, the humanoid 100 performs the predicted motions based on the signal received at step S502. The process then continues to step S505 wherein camera 104 of the humanoid 100 telecasts the humanoid's environment and the motions/actions of the humanoid 100 through the network on the display devices 301 or the optional VR equipment 302 for the remote viewers to see.

The foregoing example implementations may have various benefits and advantages. For example, example implementations allow instant access to physical environment for multiple users to collaborate with limited hardware capabilities through multi-user telexistence. Example implementations can be used, but not limited to, perform remote safe policing, auditing, maintenance, manufacturing, consultations, etc. Remote maintenance/troubleshooting can instantly provide access to support in manufacturing while reducing cost and wait time.

Figure 6:
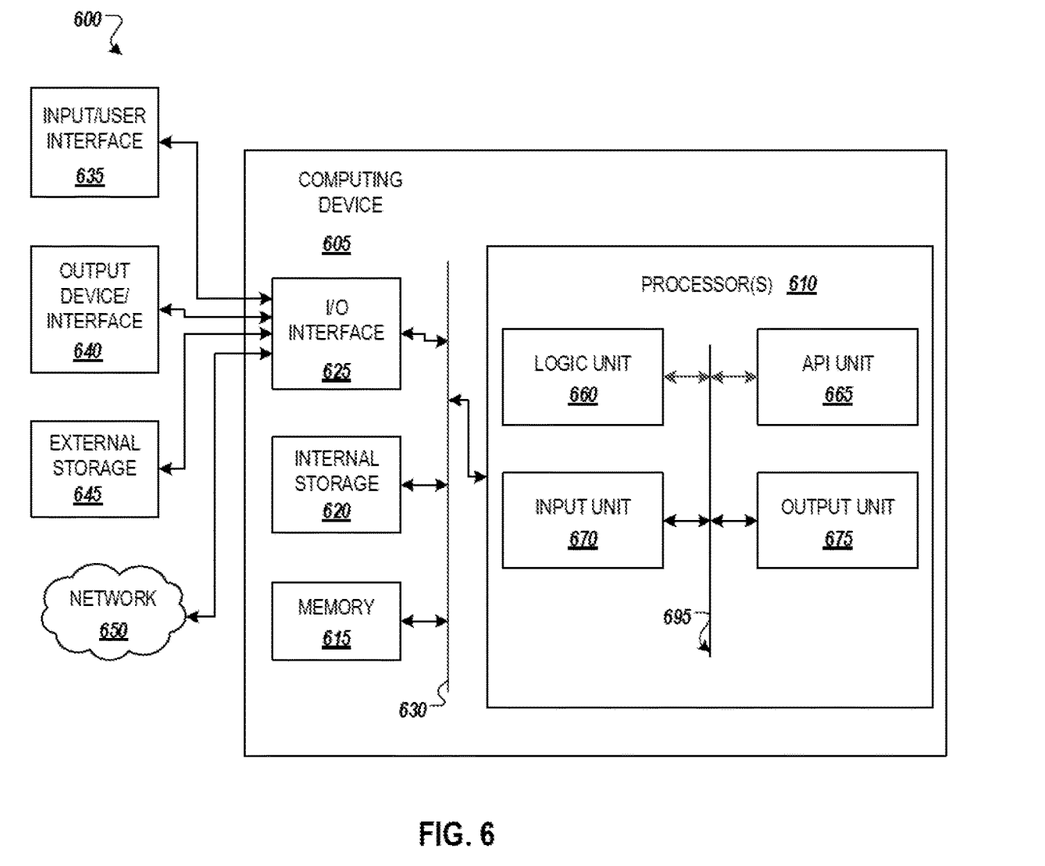
FIG. 6 illustrates an example computing environment with an example computing device suitable for use in some example implementations.

FIG. 6 illustrates an example computing environment with an example computer device suitable for use in some example implementations. Computer device 605 in computing environment 600 can include one or more processing units, cores, or processors 610, memory 615 (e.g., RAM, ROM, and/or the like), internal storage 620 (e.g., magnetic, optical, solid-state storage, and/or organic), and/or IO interface 625, any of which can be coupled on a communication mechanism or bus 630 for communicating information or embedded in the computer device 605. IO interface 625 is also configured to receive images from cameras or provide images to projectors or displays, depending on the desired implementation.

Computer device 605 can be communicatively coupled to input/user interface 635 and output device/interface 640. Either one or both of the input/user interface 635 and output device/interface 640 can be a wired or wireless interface and can be detachable. Input/user interface 635 may include any device, component, sensor, or interface, physical or virtual, that can be used to provide input (e.g., buttons, touch-screen interface, keyboard, a pointing/cursor control, microphone, camera, braille, motion sensor, accelerometer, optical reader, and/or the like). Output device/interface 640 may include a display, television, monitor, printer, speaker, braille, or the like. In some example implementations, input/user interface 635 and output device/interface 640 can be embedded with or physically coupled to the computer device 605. In other example implementations, other computer devices may function as or provide the functions of input/user interface 635 and output device/interface 640 for a computer device 605.

Examples of computer device 605 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 605 can be communicatively coupled (e.g., via IO interface 625) to external storage 645 and network 650 for communicating with any number of networked components, devices, and systems, including one or more computer devices of the same or different configuration. Computer device 605 or any connected computer device can be functioning as, providing services of, or referred to as a server, client, thin server, general machine, special-purpose machine, or another label.

IO interface 625 can include but is not limited to, wired and/or wireless interfaces using any communication or IO protocols or standards (e.g., Ethernet, 802.11x, Universal System Bus, WiMax, modem, a cellular network protocol, and the like) for communicating information to and/or from at least all the connected components, devices, and network in computing environment 600. Network 650 can be any network or combination of networks (e.g., the Internet, local area network, wide area network, a telephonic network, a cellular network, satellite network, and the like).

Computer device 605 can use and/or communicate using computer-usable or computer readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid-state media (e.g., RAM, ROM, flash memory, solid-state storage), and other non-volatile storage or memory.

Computer device 605 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 610 can execute under any operating system (OS) (not shown), in a native or virtual environment. One or more applications can be deployed that include logic unit 660, application programming interface (API) unit 665, input unit 670, output unit 675, and inter-unit communication mechanism 695 for the different units to communicate with each other, with the OS, and with other applications (not shown). The described units and elements can be varied in design, function, configuration, or implementation and are not limited to the descriptions provided. Processor(s) 610 can be in the form of hardware processors such as central processing units (CPUs) or in a combination of hardware and software units.

In some example implementations, when information or an execution instruction is received by API unit 665, it may be communicated to one or more other units (e.g., logic unit 660, input unit 670, output unit 675). In some instances, logic unit 660 may be configured to control the information flow among the units and direct the services provided by API unit 665, the input unit 670, the output unit 675, in some example implementations described above. For example, the flow of one or more processes or implementations may be controlled by logic unit 660 alone or in conjunction with API unit 665. The input unit 670 may be configured to obtain input for the calculations described in the example implementations, and the output unit 675 may be configured to provide an output based on the calculations described in example implementations.

Processor(s) 610 can be configured to receive a request to control a humanoid from a remote user as illustrated in FIG. 4. The processor(s) 610 may also be configured to determine acceptance of the request by a host as illustrated in FIG. 4. The processor(s) 610 may also be configured to, for the request being determined as accepted, verify receipt of a set of initiating signals as illustrated in FIG. 4. The processor(s) 610 may also be configured to, for the set of initiating signals being received, receive a humanoid mapping method chosen by the remote user, and control the humanoid based on the humanoid mapping method determined by the remote user as illustrated in FIG. 4. The processor(s) 610 may also be configured to, for the set of initiating signals not being received, terminate the request to control the humanoid as illustrated in FIG. 4. The processor(s) 610 may also be configured to telecast an environment perceived from a first camera coupled to the humanoid on the VR equipment of the remote user as illustrated in FIG. 4.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer readable storage medium or a computer readable signal medium. A computer readable storage medium may involve tangible mediums such as, but not limited to optical disks, magnetic disks, read-only memories, random access memories, solid-state devices, and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general-purpose computer, based on instructions stored on a computer readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method for performing telexistence, the method comprising:
receiving, by a processor, a request to control a humanoid from a remote user;
determining, by the processor, acceptance of the request by a host;
for the request being determined as accepted, verifying, by the processor, receipt of a set of initiating signals;
for the set of initiating signals being received:
receiving a humanoid mapping method chosen by the remote user, and
controlling the humanoid based on the humanoid mapping method determined by the remote user; and
for the set of initiating signals not being received, terminating, by the processor, the request to control the humanoid.

2. The method of claim 1, wherein the set of initiating signals comprises an input signal associated with a virtual reality (VR) equipment of the remote user, a movement detection signal of the remote user, and a joint weight signal transmitted by the humanoid.

3. The method of claim 2, further comprising:
telecasting an environment perceived from a first camera coupled to the humanoid on the VR equipment of the remote user.

4. The method of claim 2, wherein the movement detection signal is a feed signal obtained from a second camera directed at the remote user.

5. The method of claim 4, wherein controlling the humanoid based on the humanoid mapping method comprises:
tracking, using the second camera, motion of the remote user;
generating motion prediction using a trained machine learning model, wherein the tracked motion of the remote user is used as input to the trained machine learning model; and
performing control of the humanoid based on the generated motion prediction.

6. The method of claim 1, wherein receiving the humanoid mapping method chosen by the remote user comprises receiving a selection between humanoid-to-user mapping and user-to-humanoid mapping from the remote user.

7. The method of claim 6, wherein for the humanoid-to-user mapping being selected as the humanoid mapping method, performing:
determining, by the processor, a joint weight load associated with the humanoid;
for the joint weight load being determined as significant, the processor is configured to perform:
generating a first safety warning to the remote user,
detecting a humanoid mapping method change request made by the remote user in responses to the first safety warning, and
for the humanoid mapping method change request being detected, granting control of the humanoid to the remote user; and
for the joint weight load being not determined as significant, granting control of the humanoid to the remote user.

8. The method of claim 7, wherein for the humanoid mapping method change request not being detected, the processor is further configured to perform:
generating a second safety warning to the remote user confirming the humanoid mapping method; and
for the humanoid mapping method being confirmed in response to the second safety warning, granting control of the humanoid to the remote user.

9. The method of claim 8, wherein for the user-to-humanoid mapping being selected as the humanoid mapping method, granting, by the processor, control of the humanoid to the remote user.

10. The method of claim 9,
wherein the request to control the humanoid is received after control of the humanoid in a prior telexistence session by a prior remote user has been terminated;
wherein an orientation of the humanoid after termination of the prior telexistence session is left in a first state;
wherein, for the user-to-humanoid mapping being selected as the humanoid mapping method, mapping a body of the remote user to the orientation of the humanoid in the first state;

wherein, for the humanoid-to-user mapping being selected as the humanoid mapping method and the joint weight load being not determined as significant, changing the orientation of the humanoid to a second state by mapping the humanoid to the body of the remote user;

wherein, for the humanoid-to-user mapping being selected as the humanoid mapping method and the humanoid mapping method change request being detected, mapping the body of the remote user to the orientation of the humanoid in the first state; and wherein, for the humanoid-to-user mapping being selected as the humanoid mapping method and the humanoid mapping method change request not being detected, changing the orientation of the humanoid to the second state.

11. A system for performing telexistence, the system comprising:
a humanoid; and
a processor in communication with the humanoid, the processor is configured to:
receive a request to control the humanoid from a remote user;
determine acceptance of the request by a host;
for the request being determined as accepted, verify receipt of a set of initiating signals;
for the set of initiating signals being received:
receive a humanoid mapping method chosen by the remote user, and
control the humanoid based on the humanoid mapping method determined by the remote user; and
for the set of initiating signals not being received, terminate the request to control the humanoid.

12. The system of claim 11, wherein the set of initiating signals comprises an input signal associated with a virtual reality (VR) equipment of the remote user, a movement detection signal of the remote user, and a joint weight signal transmitted by the humanoid.

13. The system of claim 12, wherein the processor is further configured to:
telecast an environment perceived from a first camera coupled to the humanoid on the VR equipment of the remote user.

14. The system of claim 12, wherein the movement detection signal is a feed signal obtained from a second camera directed at the remote user.

15. The system of claim 14, wherein the processor is configured to control the humanoid based on the humanoid mapping method by:
tracking, using the second camera, motion of the remote user;
generating motion prediction using a trained machine learning model, wherein the tracked motion of the remote user is used as input to the trained machine learning model; and
performing control of the humanoid based on the generated motion prediction.

16. The system of claim 11, wherein the processor is configured to receive the humanoid mapping method by receiving a selection between humanoid-to-user mapping and user-to-humanoid mapping from the remote user.

17. The system of claim 16, wherein for the humanoid-to-user mapping being selected as the humanoid mapping method, the processor is configured to:
determine a joint weight load associated with the humanoid;
for the joint weight load being determined as significant:
generate a first safety warning to the remote user,
detect a humanoid mapping method change request made by the remote user in responses to the first safety warning, and
for the humanoid mapping method change request being detected, grant control of the humanoid to the remote user; and
for the joint weight load being not determined as significant, grant control of the humanoid to the remote user.

18. The system of claim 17, wherein for the humanoid mapping method change request not being detected, the processor is further configured to:
generate a second safety warning to the remote user confirming the humanoid mapping method; and
for the humanoid mapping method being confirmed in response to the second safety warning, grant control of the humanoid to the remote user.

19. The system of claim 18, wherein for the user-to-humanoid mapping being selected as the humanoid mapping method, the processor is configured to grant control of the humanoid to the remote user.

20. The system of claim 19,
wherein the request to control the humanoid is received after control of the humanoid in a prior telexistence session by a prior remote user has been terminated;
wherein an orientation of the humanoid after termination of the prior telexistence session is left in a first state;
wherein, for the user-to-humanoid mapping being selected as the humanoid mapping method, map a body of the remote user to the orientation of the humanoid in the first state;
wherein, for the humanoid-to-user mapping being selected as the humanoid mapping method and the joint weight load being not determined as significant, the processor is configured to change the orientation of the humanoid to a second state by mapping the humanoid to the body of the remote user;
wherein, for the humanoid-to-user mapping being selected as the humanoid mapping method and the humanoid mapping method change request being detected, map the body of the remote user to the orientation of the humanoid in the first state; and
wherein, for the humanoid-to-user mapping being selected as the humanoid mapping method and the humanoid mapping method change request not being detected, the processor is configured to change the orientation of the humanoid to the second state.

* * * * *